(12) United States Patent
Chou

(10) Patent No.: US 10,488,285 B2
(45) Date of Patent: Nov. 26, 2019

(54) PRESSURE GAUGE STRUCTURE

(71) Applicant: Chin Ray Industrial Ltd., Chiayi (TW)

(72) Inventor: Chiu-Sung Chou, Chiayi (TW)

(73) Assignee: Chin Ray Industrial Ltd., Chiayi (TW)

( * ) Notice: Subject to any disclaimer, the term of this patent is extended or adjusted under 35 U.S.C. 154(b) by 0 days.

(21) Appl. No.: 15/836,159

(22) Filed: Dec. 8, 2017

(65) Prior Publication Data
US 2019/0178737 A1    Jun. 13, 2019

(51) Int. Cl.
*G01L 7/02* (2006.01)
*G01L 19/14* (2006.01)

(52) U.S. Cl.
CPC .............. *G01L 7/022* (2013.01); *G01L 19/14* (2013.01)

(58) Field of Classification Search
CPC ................................. G01L 7/022; G01L 19/14
USPC ......................................................... 73/756
See application file for complete search history.

(56) References Cited

U.S. PATENT DOCUMENTS

| | | | | | |
|---|---|---|---|---|---|
| 3,072,150 | A | * | 1/1963 | Hastings | G05D 16/0636 200/83 B |
| 3,626,814 | A | * | 12/1971 | Andersson | F15B 15/10 73/862.581 |
| 5,753,821 | A | * | 5/1998 | Chou | G01L 7/084 73/715 |
| 6,263,739 | B1 | * | 7/2001 | Seefried | G01L 19/003 73/715 |
| 9,021,883 | B2 | * | 5/2015 | Wang | G01L 7/063 116/271 |
| 2003/0200812 | A1 | * | 10/2003 | Kuhn | A61M 1/3639 73/715 |

* cited by examiner

*Primary Examiner* — Nathaniel T Woodward
(74) *Attorney, Agent, or Firm* — Alan D. Kamrath; Karin L. Williams; Mayer & Williams PC

(57) ABSTRACT

A pressure gauge structure contains: a body having a bow-shaped frame and a holder mounted under the bow-shaped frame, and a contact film defined between the bow-shaped frame and the holder. A connector is connected on a bottom of the holder, and a test conduit passes through the holder and the connector and accommodates a tested object. The contact film contacts with a separation washer corresponding to the contact film.

10 Claims, 9 Drawing Sheets

PRESSURE GAUGE STRUCTURE

BACKGROUND OF THE INVENTION

Field of the Invention

The present invention relates to a pressure gauge structure configured to separate a tested object from a contact film to avoid reduction of measurement accuracy resulting from chemical corrosion, oxidation, and rust. Hence the pressure gauge structure is applicable for food and chemical fields widely.

Description of the Prior Art

A conventional pressure gauge structure is employed to measure a pressure value of gases or fluids to provide pressure parameters in production.

With reference to FIG. 9, the conventional pressure gauge structure contains a holder 10 having a connector 101 mounted on a central position of the holder 10, and a supporter 102 extending on a peripheral side of the holder 10 to contact with a metal film 20 on which multiple annular wrinkles are formed. The conventional pressure gauge structure further contains the holder 10, a fixing member 30, a middle assembly, a casing 40 covering the holder 10, and a transparent lid 401. A washer 202 is defined between the supporter 102 of the holder 10 and the metal film 20, the fixing member 30 covers the supporter 102 of the holder 10, and a concaved sheet 301 is connected with a bottom of the fixing member 30. Hence, the washer 202 is defined between the supporter 102 of the holder 10 and the concaved sheet 301 of the fixing member 30, the metal film 20 limits the holder 10 with the supporter 102, and an air chamber 103 communicates with an exterior via the connector 101.

The conventional pressure gauge structure sustains pressures sufficiently but contacts with the tested object, thus causing chemical corrosion, oxidation, and rust to influence accuracy of the conventional pressure gauge structure.

The present invention has arisen to mitigate and/or obviate the afore-described disadvantages.

SUMMARY OF THE INVENTION

The primary objective of the present invention is to provide a pressure gauge structure configured to separate a tested object from a contact film to avoid chemical corrosion, oxidation, and rust.

A further primary objective of the present invention is to provide a pressure gauge structure in which a protective sheet stops a tested object being off the charts because a distance is produced between the protective sheet and the contact film, thus avoiding damage of a body.

Another primary objective of the present invention is to provide a pressure gauge structure in which a holder and a connector are formed as one-piece to reduce manufacture process, assembly, and production cost.

To obtain the above-mentioned objectives, a pressure gauge structure provided by the present invention contains: a body having a bow-shaped frame and a holder mounted under the bow-shaped frame, a contact film defined between the bow-shaped frame and the holder, with a connector connected on a bottom of the holder, and a test conduit passing through the holder and the connector and accommodating a tested object, with the contact film contacting with a separation washer corresponding to the contact film.

In another embodiment, a pressure gauge structure provided by the present invention contains: a body having a bow-shaped frame and a holder mounted under the bow-shaped frame, a contact film defined between the bow-shaped frame and the holder, with a connector connected on a bottom of the holder, and a test conduit passing through the holder and the connector and accommodating a tested object, with a protective sheet defined between the bow-shaped frame and the contact film.

In another embodiment, a pressure gauge structure provided by the present invention contains: a body having a bow-shaped frame and a holder mounted under the bow-shaped frame, a contact film defined between the bow-shaped frame and the holder, with a connector connected on a bottom of the holder, and a test conduit passing through the holder and the connector and accommodating a tested object, with the holder and the connector formed as one-piece.

DETAILED DESCRIPTION OF THE PREFERRED EMBODIMENTS

The present invention will be clearer from the following description when viewed together with the accompanying drawings, which show, for purpose of illustration only, preferred embodiments in accordance with the present invention.

Figure 1:
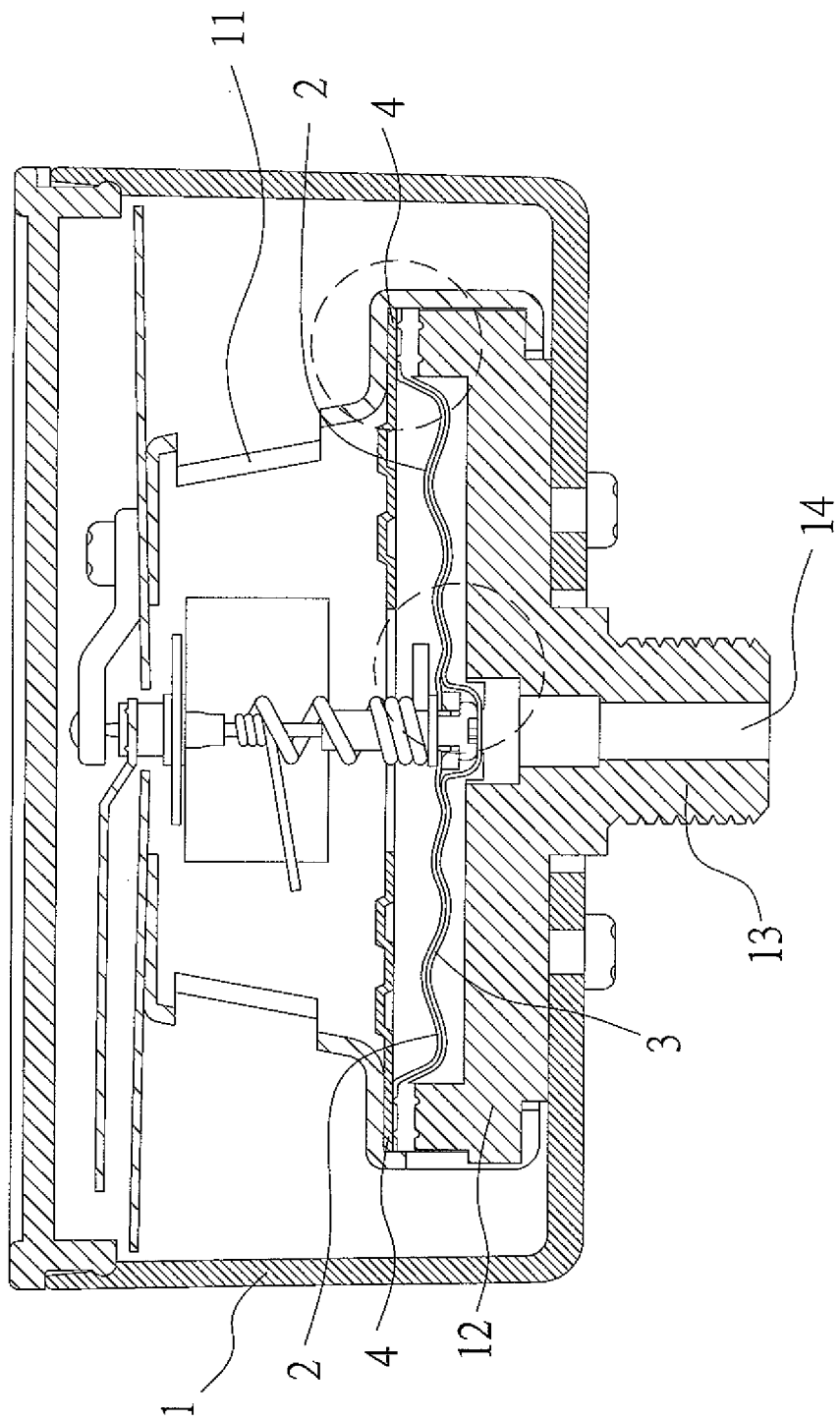
FIG. 1 is a cross sectional view showing the assembly of a pressure gauge structure according to a preferred embodiment of the present invention.
Figure 2:
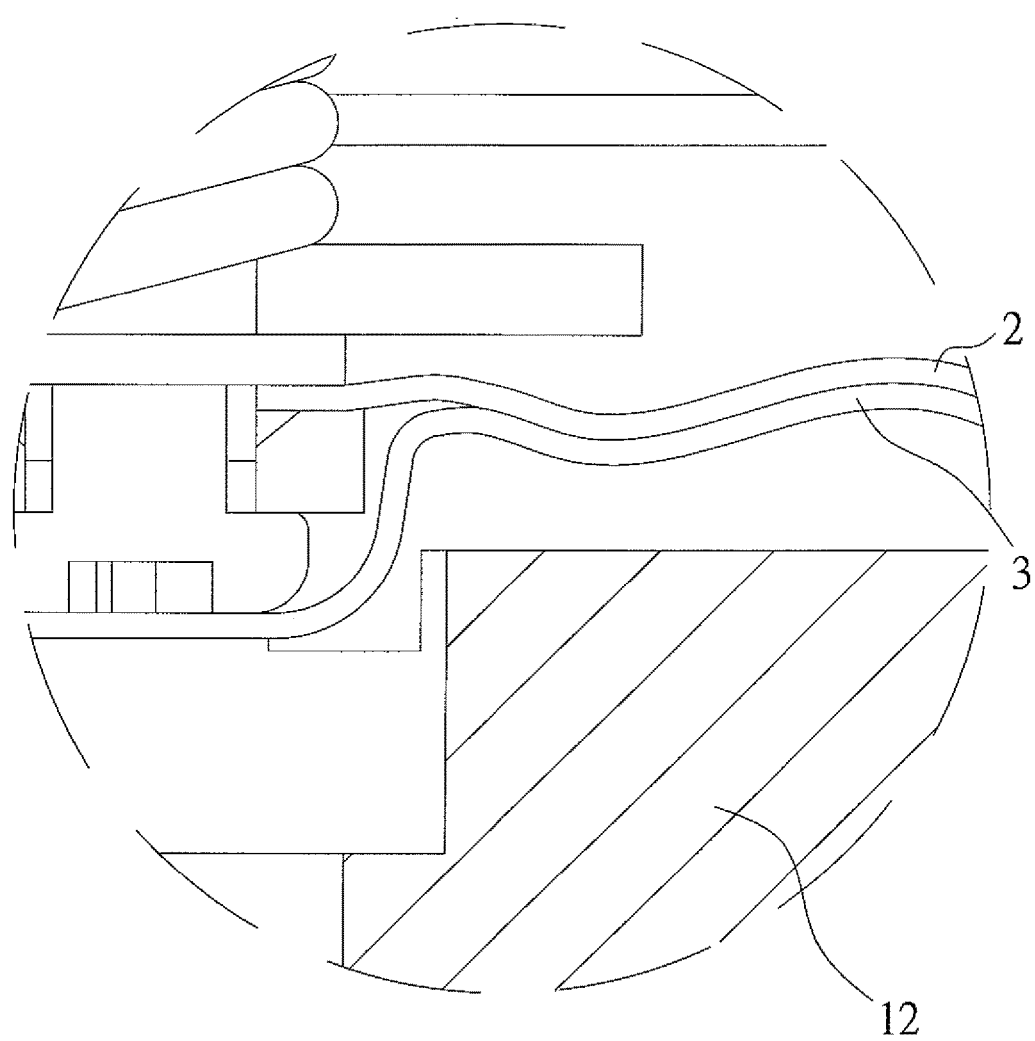
FIG. 2 is a cross sectional view showing the assembly of a part of the pressure gauge structure according to the preferred embodiment of the present invention.

With reference to FIGS. 1-2, a pressure gauge structure in accordance with a preferred embodiment of the present invention comprises: a body 1 having a bow-shaped frame 11 and a holder 12 mounted under the bow-shaped frame 11, and a contact film 2 defined between the bow-shaped frame 11 and the holder 12. A connector 13 is connected on a bottom of the holder 12, and a test conduit 14 passes through the holder 12 and the connector 13 and accommodates a tested object.

The contact film 2 contacts with a separation washer 3 corresponding to the contact film 2. When the tested object sends pressure to the separation washer 3 via the test conduit 14, the separation washer 3 pushes the contact film 2 upward to measure pressure parameter(s) of the contact film 2 and to avoid the tested object contacting with the contact film 2, thus maintaining accuracy of the body 1 resulting from rust and prolonging service life of the body 1.

A contact surface of the separation washer 3 and the contact film 2 is irregularly wavy.

Figure 3:
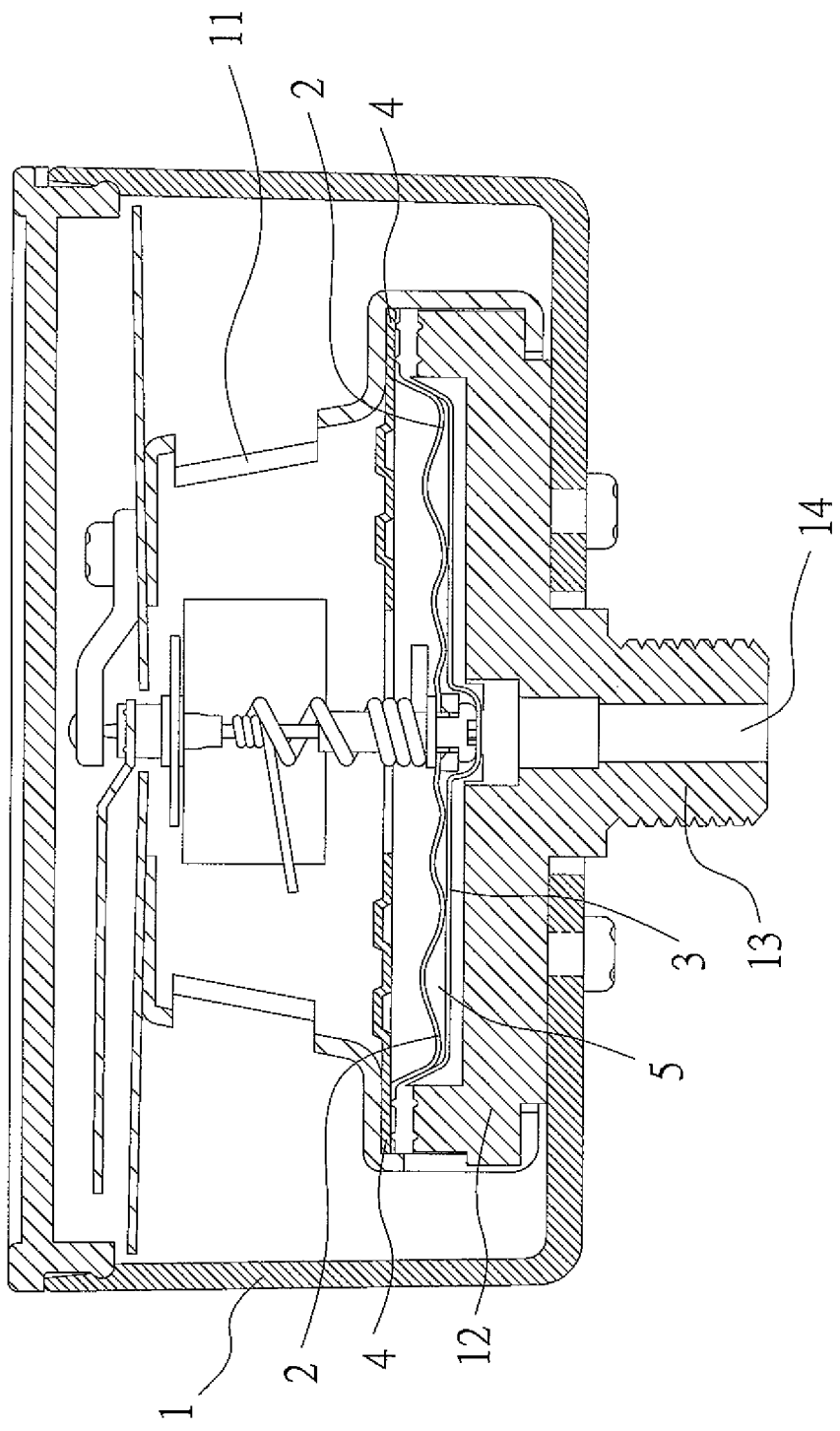
FIG. 3 is a cross sectional view showing the assembly of a pressure gauge structure according to another preferred embodiment of the present invention.

A contact surface of the separation washer 3 and the contact film 2 is flat, as shown in FIG. 3.

Figure 4:
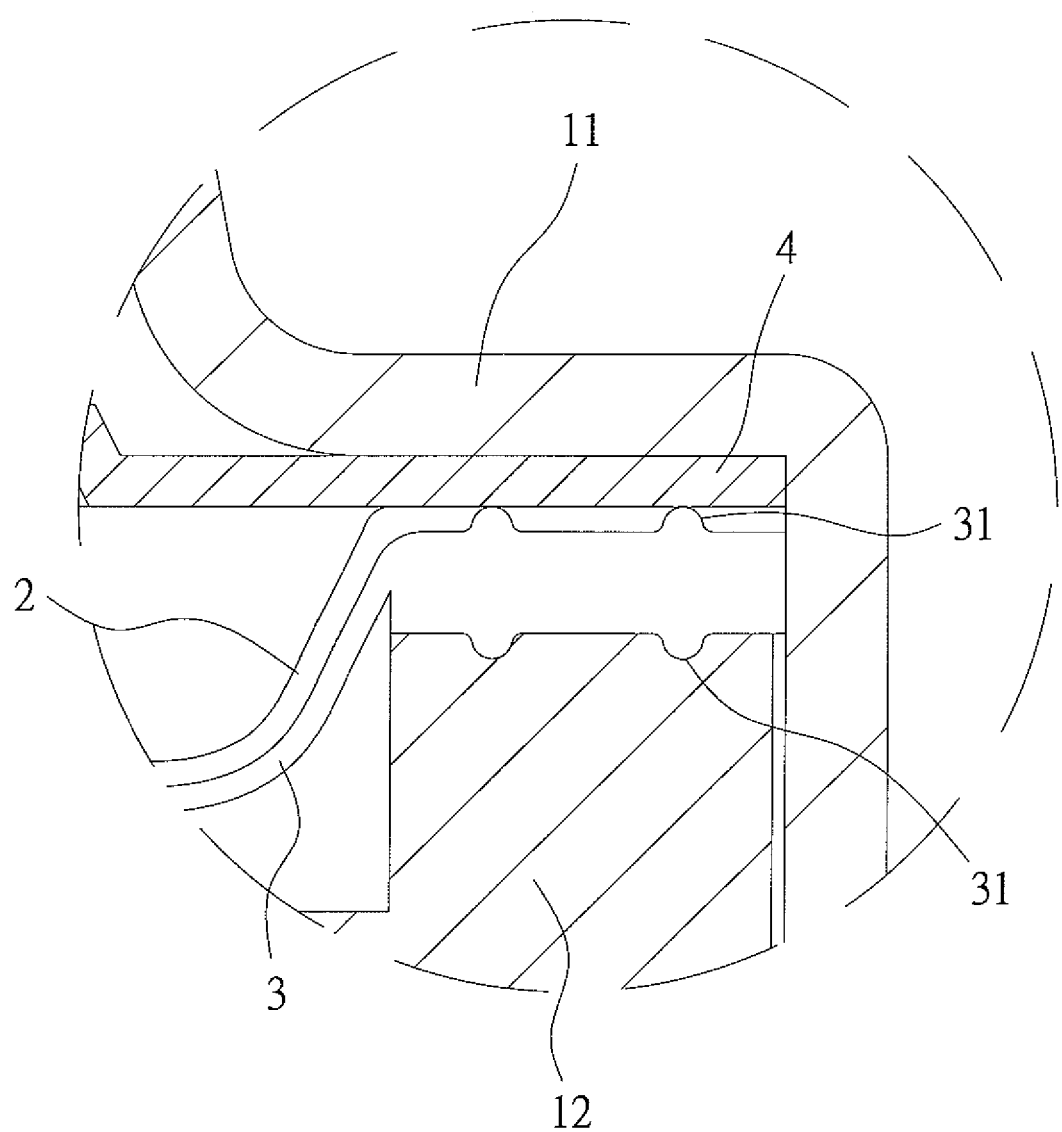
FIG. 4 is an amplified cross sectional view of FIG. 1.

The separation washer 3 includes multiple protrusions 31 arranged around a peripheral side thereof and configured to contact with the contact film 2 and the holder 12, such that the separation washer 3 offsets an unequal action force resulting from the pressure to enhance a closing effect, as illustrated in FIG. 4.

The separation washer 3 is made of flexible material, such as rubber or silicone.

The contact film 2 includes a protective sheet 4 mounted above the contact film 2 and defined between the bow-shaped frame 11 and the contact film 2.

The holder 12 and the connector 13 are formed as one-piece to reduce manufacture process, assembly, and production cost.

Figure 5:
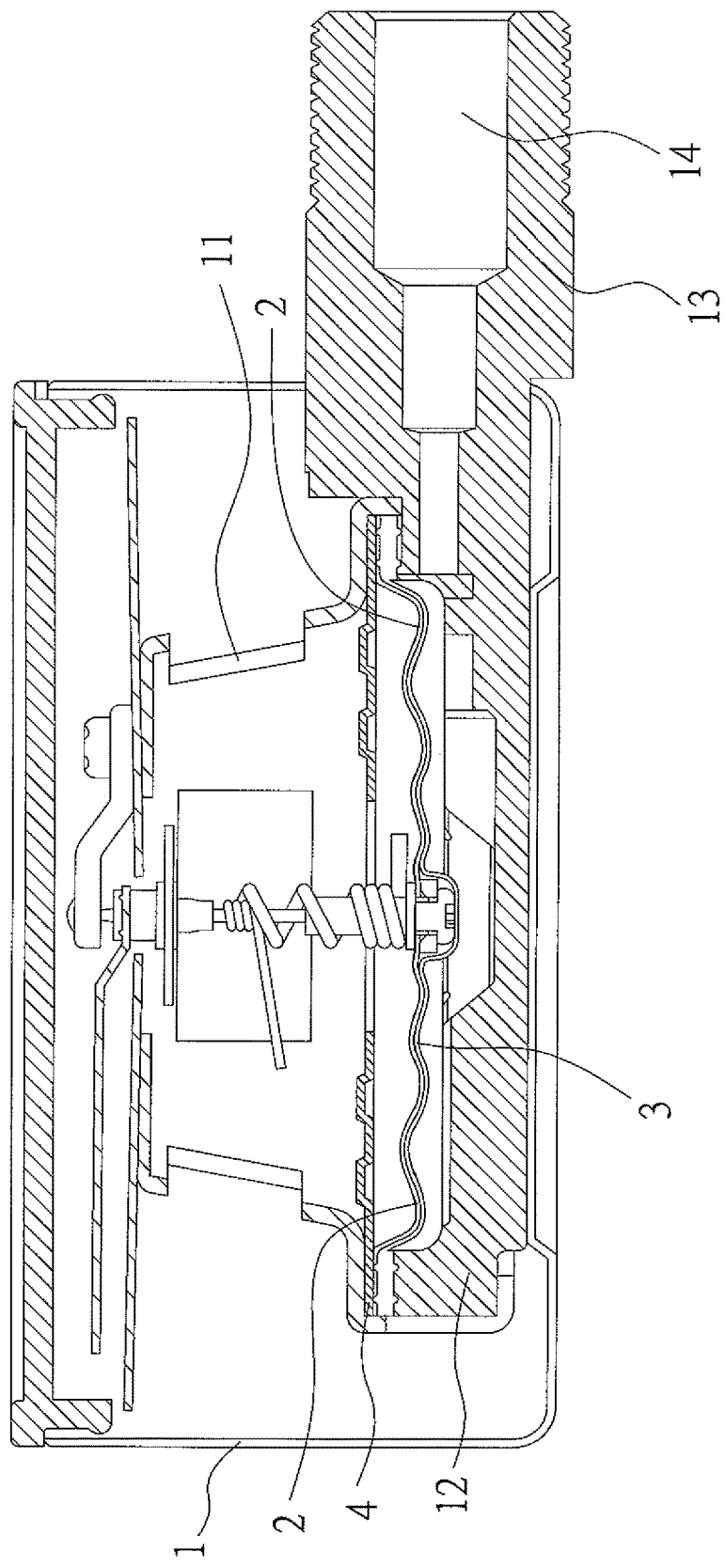
FIG. 5 is a cross sectional view showing the assembly of a pressure gauge structure according to another preferred embodiment of the present invention.

The connector 13 is longitudinal or lateral, as shown in FIG. 5.

Figure 6:
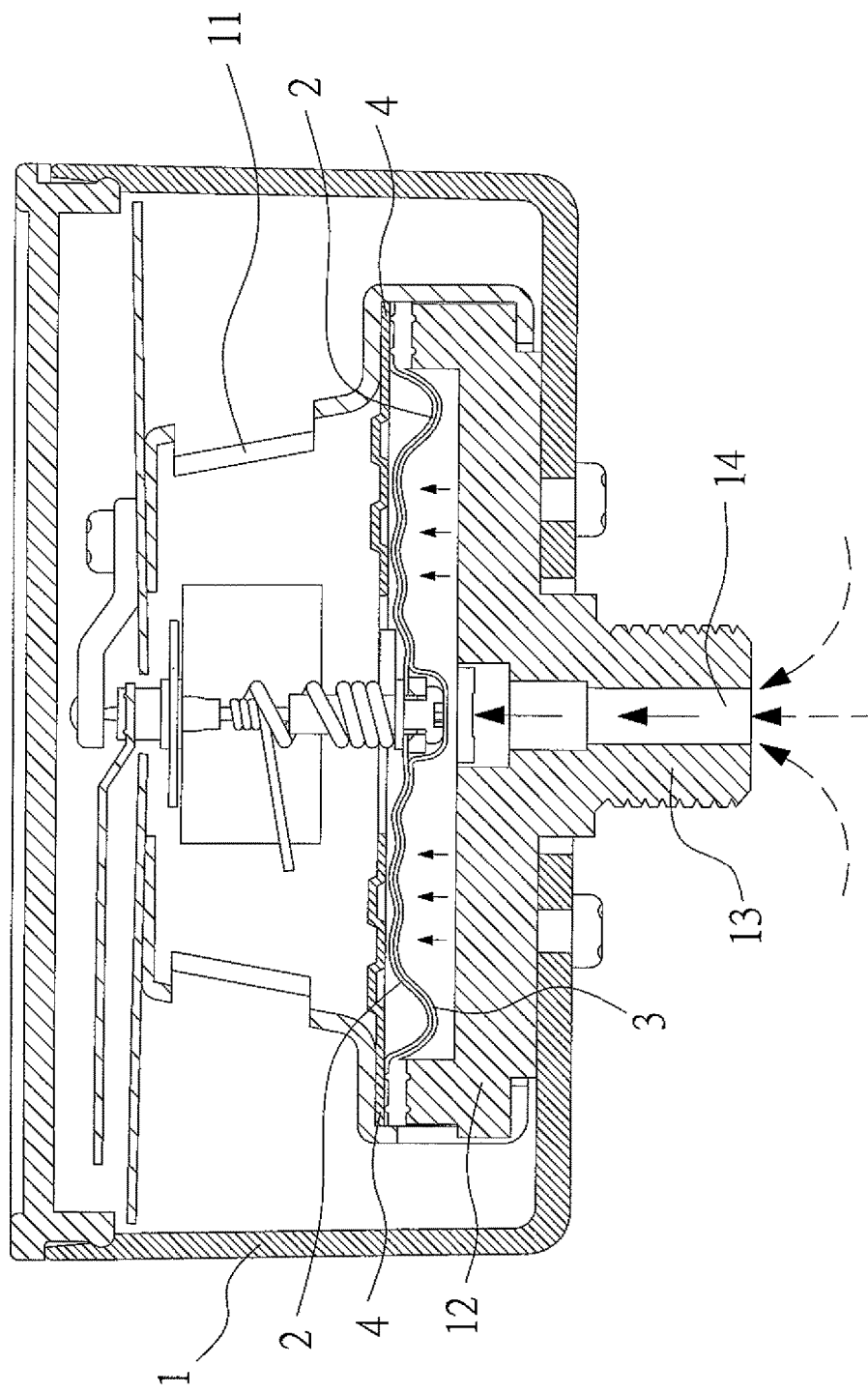
FIG. 6 is a cross sectional view showing the operation of the pressure gauge structure according to another preferred embodiment of the present invention.
Figure 7:
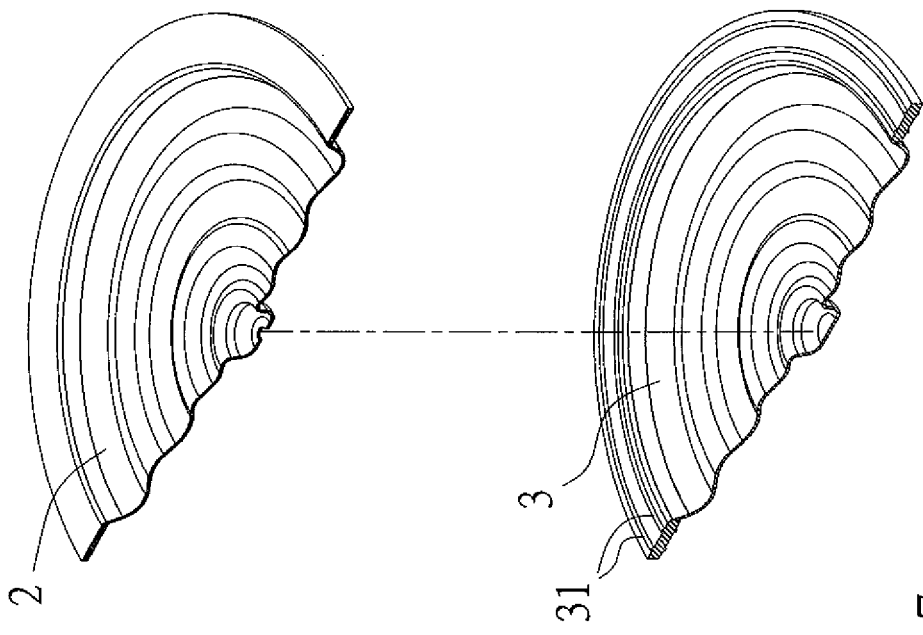
FIG. 7 is a cross-sectional perspective view showing the assembly of a part of the pressure gauge structure according to the preferred embodiment of the present invention.
Figure 7:
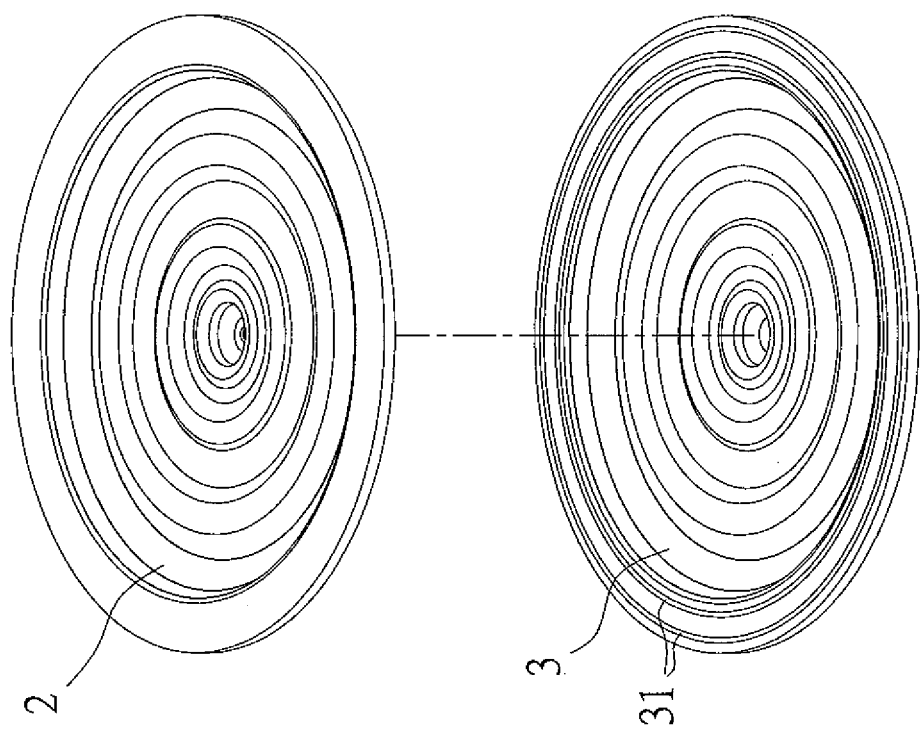
Figure 8:
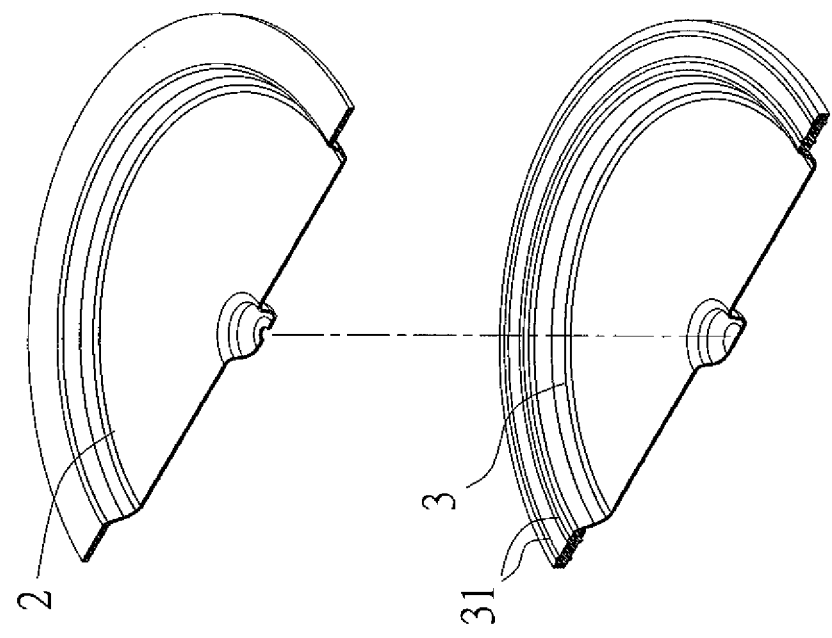
FIG. 8 is a cross-sectional perspective view showing the assembly of a part of the pressure gauge structure according to another preferred embodiment of the present invention.
Figure 8:
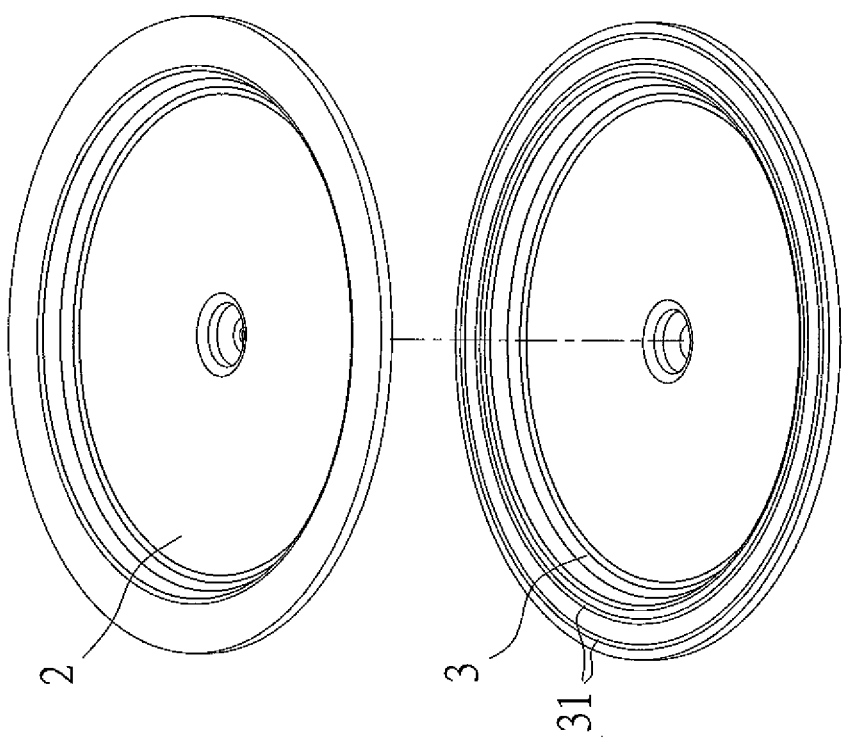
Figure 9:
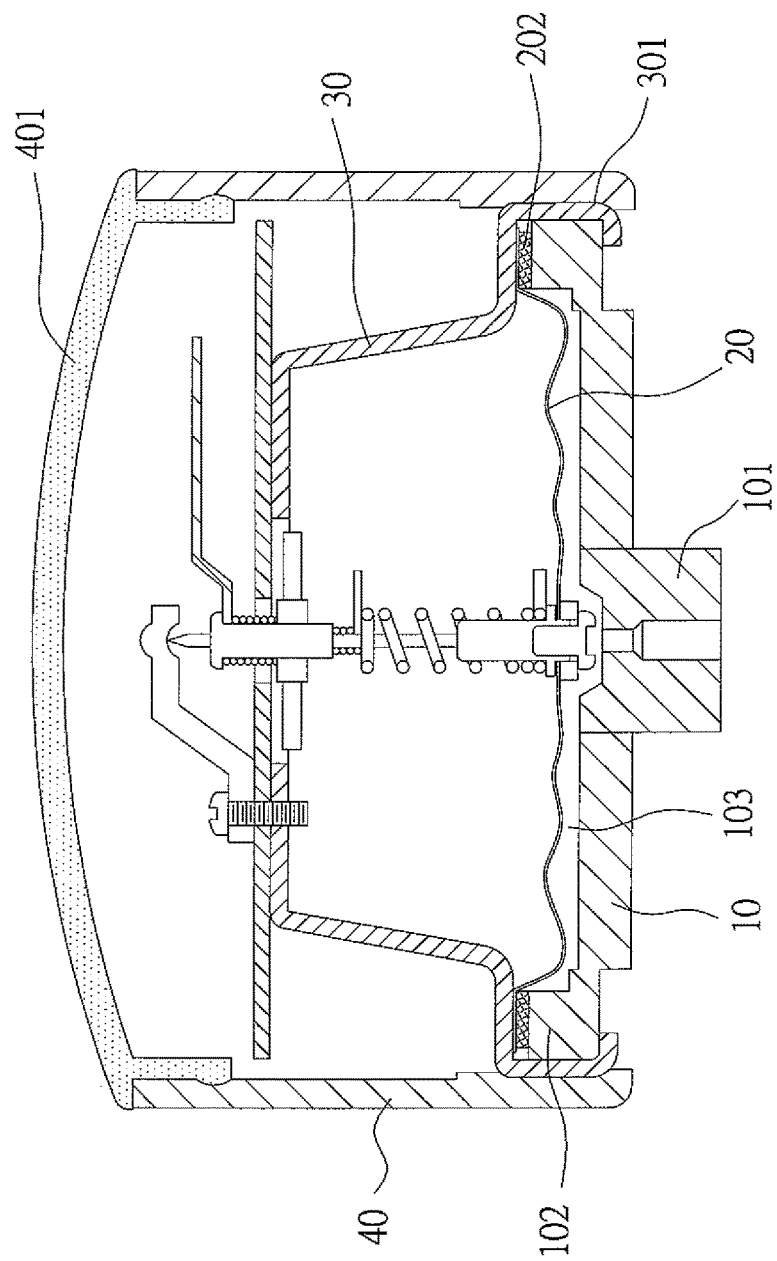
FIG. 9 is a cross sectional view of a conventional pressure gauge structure.

In operation, as illustrated in FIGS. 6-8, the tested object is connected on the connector 13 to enter into the test conduit 14, and the tested object pushes the separation washer 3 and drives the contact film 2 to move upward. Hence, an air chamber 5 forms between the separation washer 3 and the holder 12, and the separation washer 3 and the holder 12 push the contact film 2 directly or indirectly. Preferably, the multiple protrusions 31 of the separation washer 3 offset the unequal pressure sent by the tested object and enhance the closing effect, so that a display unit displays accurate measured data. When the tested object does not contact with the contact film 2 completely, the pressure gauge structure is not eroded by the tested object to keep measurement accuracy. Hence, the pressure gauge structure is applicable for industrial, food, and chemical fields widely.

When the tested object enters into the test conduit 14 at a high pressure quickly, the separation washer 3 and the contact film 2 are driven to move upward. When the pressure is more than a measurement range, the protective sheet 4 stops the contact film 2 being off the charts, thus avoiding damage of the body 1.

Thereby, the separation washer separates from and protects the contact film to avoid rust and to expand the using field. Preferably, the protective sheet stops the contact film from being off the charts, thus decreasing failure rate. The holder and the connector are formed as one-piece to lower production cost.

While various embodiments in accordance with the present invention have been shown and described, it is clear to those skilled in the art that further embodiments may be made without departing from the scope of the present invention.

What is claimed is:

1. A pressure gauge structure comprising:
   a body having a bow-shaped frame and a holder mounted under the bow-shaped frame;
   a contact film having an outer periphery defined between the bow-shaped frame and the holder, wherein a connector is connected on a bottom of the holder;
   a test conduit aligned with a center of the contact film passes through the holder and the connector and accommodates a tested object; and
   a separation washer contacting the contact film from the outer periphery to a center portion of the contact film, with an air chamber defined between the separation washer and the holder, wherein the separation washer includes multiple protrusions arranged around a peripheral side thereof and intermediate the outer periphery of the contact film and the holder, with the separation washer configured to prevent contact of the tested object with the contact film.

2. The pressure gauge structure as claimed in claim 1, wherein a contact surface of the separation washer and the contact film is flat.

3. The pressure gauge structure as claimed in claim 1, wherein a contact surface of the separation washer and the contact film is irregularly wavy.

4. The pressure gauge structure as claimed in claim 1, wherein the multiple protrusions contact the contact film and the holder.

5. The pressure gauge structure as claimed in claim 1, wherein the separation washer is made of flexible material, and the flexible material is rubber.

6. The pressure gauge structure as claimed in claim 1, wherein the separation washer is made of flexible material, and the flexible material is silicone.

7. The pressure gauge structure as claimed in claim 1, wherein a protective sheet is defined between the bow-shaped frame and the contact film.

8. The pressure gauge structure as claimed in claim 1, wherein the holder and the connector are formed as one-piece.

9. The pressure gauge structure as claimed in claim 8, wherein the connector is longitudinal relative to the contact film.

10. The pressure gauge structure as claimed in claim 8, wherein the connector is lateral relative to the contact film.

* * * * *